United States Patent
Enßlin et al.

(10) Patent No.: US 11,252,275 B2
(45) Date of Patent: Feb. 15, 2022

(54) METHOD FOR ADJUSTING AT LEAST ONE FUNCTION OF A MOBILE WIRELESS DEVICE IN A VEHICLE AND MOBILE WIRELESS DEVICE STAND

(71) Applicant: Dr. Ing. h.c. F. Porsche Aktiengesellschaft, Stuttgart (DE)

(72) Inventors: Christina Enßlin, Mönsheim (DE); Samuel Gonzalez Moraleja, Herrenberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/206,244

(22) Filed: Mar. 19, 2021

(65) Prior Publication Data

US 2021/0337063 A1   Oct. 28, 2021

(30) Foreign Application Priority Data

Apr. 22, 2020   (DE) .................... 10 2020 110 972.5

(51) Int. Cl.
*H04M 1/72454*   (2021.01)
*H04M 1/72466*   (2021.01)
*H04M 1/04*   (2006.01)

(52) U.S. Cl.
CPC ......... *H04M 1/72454* (2021.01); *H04M 1/04* (2013.01); *H04M 1/72466* (2021.01); *H04M 2250/04* (2013.01)

(58) Field of Classification Search
CPC . H04M 2250/04; H04M 1/72454; H04M 1/04
See application file for complete search history.

(56) References Cited

U.S. PATENT DOCUMENTS

| | | | |
|---|---|---|---|
| 9,919,648 B1* | 3/2018 | Pedersen | G08G 1/096783 |
| 2013/0142354 A1* | 6/2013 | Kriegel | H04H 60/74 |
| | | | 381/86 |

(Continued)

FOREIGN PATENT DOCUMENTS

| | | |
|---|---|---|
| DE | 102012020611 A1 | 4/2014 |
| DE | 102018000462 A1 | 5/2019 |

OTHER PUBLICATIONS

Sauter, M., "Grundkurs Mobile Kommunikationssysteme", 6. Auflage, Wiesbaden: Springer Vieweg, 2015. Titelseite, Impressum, Seiten IX-XV, 375-424.

*Primary Examiner* — Keith Ferguson
(74) *Attorney, Agent, or Firm* — RatnerPrestia

(57) ABSTRACT

A method for adjusting at least one function of a mobile telephone in a vehicle includes the steps of: reading out a first information item from a module suitable for wireless near-field communication which is arranged in a mobile phone stand of the vehicle, by way of a corresponding readout module of the mobile phone; transmitting a second information item from the mobile phone to a system module of the vehicle; receiving and processing the second information item in the system module of the vehicle in order to provide a third information item; transmitting the third information item from the system module of the vehicle to the mobile phone; and adjusting the at least one function of the mobile phone on the basis of the received third information item.

16 Claims, 1 Drawing Sheet

(56) References Cited

U.S. PATENT DOCUMENTS

| | | | |
|---|---|---|---|
| 2015/0382156 A1* | 12/2015 | Gruteser | H04W 4/021 |
| | | | 455/456.1 |
| 2016/0087485 A1* | 3/2016 | Maeda | H02J 7/025 |
| | | | 455/573 |
| 2016/0214621 A1* | 7/2016 | Baalu | B60K 37/02 |
| 2017/0201115 A1* | 7/2017 | Stickley | B60R 11/0241 |
| 2017/0331936 A1* | 11/2017 | Juzswik | H04B 1/3877 |
| 2020/0124227 A1* | 4/2020 | Fine | H04B 1/3888 |
| 2020/0164747 A1* | 5/2020 | Oh | B60K 35/00 |

* cited by examiner

METHOD FOR ADJUSTING AT LEAST ONE FUNCTION OF A MOBILE WIRELESS DEVICE IN A VEHICLE AND MOBILE WIRELESS DEVICE STAND

CROSS REFERENCE TO RELATED APPLICATION

This application claims priority to German Patent Application No. 10 2020 110 972.5, filed Apr. 22, 2020, the content of such application being incorporated by reference herein in its entirety.

FIELD OF THE INVENTION

The present invention relates to a method for adjusting at least one function of a mobile telephone in a vehicle, as well as a mobile phone stand which is used to carry out the method.

BACKGROUND OF THE INVENTION

One of the functions of a modern infotainment system in a vehicle is to enable a seamless integration of the functions of a mobile telephone. This allows the infotainment system to access the basic functions of the mobile phone without the need to operate the phone directly. For a majority of drivers, convenient access to the mobile phone while driving is essential, since mobile accessibility has a high priority, in particular in modern society.

It may sometimes be the case, however, that a driver does not want to be contactable while driving, for which there may be several reasons. For example, it may be that the driver would like to use the time while driving for a "digital detox", and at the same time may want to concentrate fully on controlling the vehicle. Constant availability, sensory overload and dependency leads to subjective temporary stress, which can be at least partially reduced by digital detoxification. Also, the fear of surveillance and the loss of a private space can give rise to the desire to be unavailable during a car journey. Due to the stress and the pressure of time typical of everyday life, customers often make changes to their mobile phone settings while driving because they did not set them or did not set them correctly before starting the journey (e.g. Bluetooth is not on, so that the mobile phone is not paired with the vehicle and hence the driver cannot make calls using the hands-free system). These activities not only pose a safety risk due to distraction, but they also contribute an additional stress factor at the start of the journey. In addition, the settings (airplane mode, WLAN, Bluetooth) must be manually changed individually, which requires multiple interactions with the mobile phone.

Against this background, described herein is a method and a device that facilitate the adjustment of the operating state of a mobile telephone carried in the vehicle and coupled to its infotainment system.

SUMMARY OF THE INVENTION

The above challenges are addressed by means of the method for adjusting at least one function of a mobile phone in a vehicle, and by the mobile phone stand for a vehicle, as are described herein.

Generally speaking, the solution adopted according to aspects of the invention is based on the use of a hardware/software combination which allows the driver to determine when and in what form he/she may be contacted. For this purpose, the mobile phone functions, in particular the functions affecting its communication with the outside world, are individually adjusted, for example by activating or deactivating them. The hardware component is formed by a mobile phone stand, which can have the form of a support/mat, for example, and is preferably equipped with anti-slip functionality. A near-field communication module is integrated into this hardware component. As soon as the mobile phone is placed on the stand, a predetermined information exchange takes place between the near-field communication module, the mobile phone and between the mobile phone and the infotainment system of the vehicle, wherein on the one hand, the presence of a mobile phone on or in the mobile phone stand is detected and, on the other hand, the mobile phone is also identified. When the mobile phone is detected on or in the mobile phone stand, an inductive charging operation can also be activated by means of a charging coil arranged in the mobile phone stand. When the presence of the mobile phone is detected on or in the mobile phone stand, the driver can also be offered options for adjusting the operating state of the mobile phone on a display of the vehicle's infotainment system. For example, it can be queried which of the predefined operating state profiles should be activated on the mobile phone (for example, offline or airplane mode, sleep mode or a user-defined operating state profile). Alternatively or in addition, individual functions (e.g. WLAN, Bluetooth, vibration alarm, ring-tone volume) can be activated, deactivated, or adjusted in other ways (e.g. volume up/down) directly via the display.

For example, if WLAN is on and Bluetooth is off in the default setting of the mobile phone, the mobile phone rechargeable battery will constantly consume power. In the vehicle, the WLAN can normally be left off. In addition, if the driver also does not want to be reachable, Bluetooth can also be deactivated. These functions can be individually activated/deactivated on the display or else an appropriately defined operating profile can be activated, which comprises the desired settings as a group. Each detected mobile phone can be assigned a time-dependent and/or spatially dependent (i.e. depending on the geographical position of the vehicle) operating profile as a preset operating profile, which is activated automatically when the respective mobile phone is detected.

The invention allows the driver to drive off without the inconvenience of making the desired adjustments individually and manually in the mobile phone, particularly in the case where the multiple settings are changed together/simultaneously via predefined operating profiles. Furthermore, the adjustment of the at least one function of the mobile phone can be performed via a larger display than that of the mobile phone, and thus more conveniently.

In various embodiments a method for adjusting at least one function of a mobile phone in a vehicle is provided, wherein the method comprises initially reading out a first information item from a module suitable for wireless near-field communication, which is arranged in a mobile phone stand of the vehicle, using a corresponding readout module of the mobile phone. The method also comprises transmitting a second information item from the mobile phone to a system module of the vehicle and receiving and processing the second information item in the system module of the vehicle in order to provide a third information item. The method also comprises transmitting the third information item from the system module of the vehicle to the mobile phone. The method then comprises adjusting (e.g. modifying) the at least one function of the mobile phone based on the received third information item. The mobile phone used in the context of this invention may be, in particular, a smartphone.

By reading out the first information item, the mobile phone is alerted to the fact that it is in a predetermined location, in this case in or on the mobile phone stand in the vehicle. The reading out of the first information item can be conveniently spatially confined to the immediate vicinity of the mobile phone stand, so that the mobile phone can only read out the first information item if it has been placed on the mobile phone stand. For example, the first information item may include information to identify the vehicle and/or a prompt to launch a specific application on the mobile phone.

The spatial restriction of the reading ability of the near-field communication module can be achieved by selecting a suitable communication protocol. The module suitable for wireless near-field communication can be a passive or active transponder, which is designed according to one of the industry standards ISO 1443, ISO 15693 or ISO 18092, for example. Preferably, the near-field communication module can be a passive or active RFID transponder. The readout module of the mobile phone can be a suitably designed near-field communication reading module matched to the phone, for example an RFID chip, which is usually built into modern smartphones. NFC can also preferably be used as a specific communication technology based on RFID protocols. As a result, the near-field communication module can be an NFC transponder and the near-field communication reader module can be the NFC chip of a mobile phone.

The near-field communication module can be integrated in the mobile phone stand, which can be designed, for example, as a stand which can preferably have a surface that is adherent or coated with an anti-slip coating, or can be designed as a device into which the mobile phone can be inserted. The mobile phone stand can be arranged anywhere in the vehicle, for example on the dashboard, in the central console or in the glove compartment.

After reading out the first information item, the mobile phone transmits the second information item to the vehicle, for example to a system module of the vehicle. The system module can be the central control unit for audio and communication. In particular, the system module can be the infotainment system of the vehicle and thus represent the central control unit for audio and communication, which carries different names depending on the manufacturer, such as MIM (modular infotainment module) or PCM (Porsche Communication Management). The second information item can contain, for example, an identification of the mobile phone. By receiving and evaluating the second information item from the mobile phone, the system module of the vehicle is alerted that a mobile phone is present in the mobile phone stand. In addition, the mobile phone can also be identified on the basis of the second information item received.

Once the processing of the second information item is complete, the system module generates a third information item which is transmitted to the mobile phone. In particular, the third information item may contain at least one instruction that is used to configure the mobile phone. The at least one instruction can be used to adjust the at least one function of the mobile phone, as already described.

The reading of the first information item from the near-field communication module and the communication between the mobile phone and the system module of the vehicle can be handled via the same interface or via different interfaces. In the first case, for example, the RFID or the NFC interface can be used for both communications, while in the second case, the first information item can be read out from the near-field communication module using the RFID or NFC interface and the mobile phone can subsequently communicate with the vehicle's system module via WLAN or Bluetooth.

According to further embodiments of the method, the module suitable for wireless communication can be integrated in a mobile phone stand of the vehicle. In combination with a desired short range of the information transmission in the range of a few centimeters, for example 5 cm, up to approximately 10 cm around the mobile phone stand, it can be ensured that the mobile phone can only read out the first information item if it is actually placed in the mobile phone stand. For example, this can prevent the method described here from being initiated when the driver is near to the vehicle for an extended period without entering it, for example.

According to further embodiments of the method, the mobile phone stand can comprise a support surface for the mobile phone, which has an anti-slip coating. In other words, the support surface can be designed to be adherent and/or have a high coefficient of friction. Such a design can be used to create an inconspicuous or less noticeable mobile phone stand, which despite having no recess, holding frame or other holding mechanisms, can nevertheless prevent the mobile phone from sliding off the stand while the vehicle is driven.

According to other embodiments, the method can also comprise launching a pre-determined application on the mobile phone in response to the reading of the first information item, the second information item being provided by the pre-determined application. The application can be a manufacturer-specific application which is configured to provide the communication with the system module of the vehicle via a communication interface. As mentioned above, the communication interface can be the same communication interface that was used to read out the first information item. Alternatively, the application may be configured to activate a mobile phone communication interface that was not activated at the time it was invoked, such as Bluetooth or WLAN, in order to handle the communication with the system module via one of these interfaces.

According to further embodiments of the method, adjusting the at least one function can set the communication capability of the mobile phone with its surroundings. The communication capability of the mobile phone in this context means the ability of the mobile phone to send and receive data via wireless interfaces (e.g. mobile phone, WLAN, Bluetooth) and thus to communicate with other devices, as well as its ability to communicate with the user by means of acoustic, visual and/or haptic means. Thus, the adjustment of the at least one function of the mobile phone may relate, for example, to the modification of the operating state of the mobile wireless module, the WLAN module, the Bluetooth module, as well as the ring tone and/or other audible notification tones of the mobile phone and the vibration mode. Each of these exemplary functions mentioned can be modified, for example activated or deactivated, in any combination with other functions. Adjusting the at least one feature may comprise, in particular, activating or deactivating pre-configured operating modes on the mobile phone, such as the sleep mode or offline mode. In addition, operating modes on the mobile phone pre-configured by the driver in the system module can also be activated.

According to other embodiments, the method may also comprise activating an inductive charging interface based on the processed second information item. The detection of the presence of the mobile phone on the mobile phone stand can therefore be understood from the point of view of the system module as enabling charging. If, on the basis of the second information item, it is determined that the mobile phone has an inductive charging interface and that the battery is not fully charged or that its charge level is below a predefined threshold, a charging coil provided in the mobile phone stand can be activated accordingly to charge the mobile phone inductively.

According to further embodiments, the third information item can be provided on the basis of a preset operating profile assigned to the mobile phone. For this purpose, different operating profiles can be deposited (stored) in the system module, wherein each operating profile can be assigned to the corresponding mobile phone based on the second information item which the mobile phone transmits to the system module. Each operating profile can define how the at least one function on the mobile phone is to be adjusted, whether the offline mode or sleep mode should be activated, for example. In other words, each operating profile can contain information that can be used to adjust the operating state of the mobile phone. The operating profiles may have been configured in advance by the user of the mobile phone and/or (at least partially) derived from inputs entered by the user via a user interface of the vehicle with regard to the adjustment of the at least one function.

According to further embodiments of the method, the third information item can also be provided on the basis of a user input made by the user via a user interface of the vehicle. In particular, once the second information has been received by the vehicle's system module, the user can be prompted for user inputs via the user interface. These user inputs can be, but do not need to be, requested every time the system module receives the second information item, i.e. every time the mobile phone is placed in the mobile phone stand. Consequently, the method can also comprise displaying at least one adjustment option with regard to the at least one function of the mobile phone, and providing the third information item on the basis of the selection made by the driver in this respect. The communication with regard to the adjustment options of the mobile phone functions can be carried out by means of the vehicle's display, which is linked to or corresponds to a component of the system module, and performed as part of the processing of the second information item. If the user does not make any entries, the operating mode of the mobile phone can be left unchanged or else a preset, default mode can be activated (e.g. ring-tone volume 50%, WLAN off, Bluetooth on).

In further embodiments, a mobile phone stand for a vehicle is provided, having a support surface for storing the mobile phone, and a module suitable for wireless near-field communication.

As described above, the module suitable for wireless near-field communication can be an RFID transponder or an NFC transponder, which can be passive or active. In the context of the present invention it is advantageous to use a passive transponder, since in this case no readout of the first information item over long ranges is needed anyway.

According to further embodiments of the mobile phone stand, the support surface can have an anti-slip coating.

The aforementioned features and those yet to be explained below can be applied not only in the corresponding specified combination, but also in other combinations or in isolation, without departing from the scope of the present invention.

BRIEF DESCRIPTION OF THE DRAWING FIGURES

Further advantages and embodiments of the invention are derived from the description and the enclosed drawings.

DETAILED DESCRIPTION OF THE INVENTION

Figure 1:
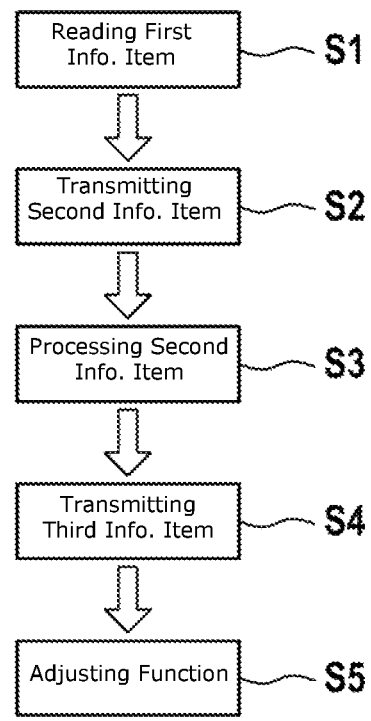
FIG. 1 shows a flowchart illustrating the sequence of the method according to aspects of the invention.

FIG. 1 shows a flowchart illustrating the sequence of the method according to aspects of the invention. In a first step S1, the method comprises reading out a first information item from a near-field communication module which is integrated in a mobile phone stand in the vehicle. In a second step S2 a second information item is transmitted from the mobile phone to a system module of the vehicle. In a third step S3, the second information item is received and processed in the system module of the vehicle in order to provide a third information item. In a fourth step S4, the third information item provided is transmitted from the system module of the vehicle to the mobile phone. Finally, in a fifth step S5 the at least one function of the mobile phone is adjusted on the basis of the received third information item.

In other exemplary embodiments, the method can also comprise, as part of the third step S3, displaying at least one adjustment option with regard to the at least one function of the mobile phone, and providing the third information item on the basis of the selection made by the driver in this respect. In this case, on a display of the vehicle the driver can be offered a plurality of options for adjusting the operating mode of the mobile phone, for example by displaying at least one operating profile that can be activated on the mobile phone and/or by displaying functions (e.g. Bluetooth, WLAN, mobile wireless module, ring tone volume) that can be activated, deactivated or modified. The selection can be made by selecting a "yes" or "no" or an "on" or "off" for each setting option. By taking into account the selection made by the driver when generating the third information item to be transmitted to the mobile phone, the mobile phone can be configured according to the current request.

Figure 2:
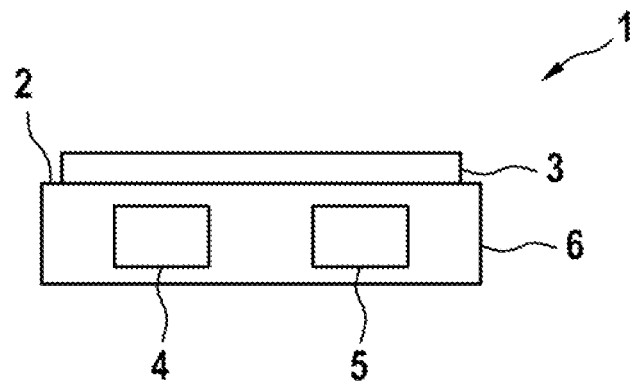
FIG. 2 shows a schematic illustration of the mobile telephone stand according to aspects of the invention.

FIG. 2 shows a schematic illustration of the mobile phone stand 1 according to aspects of the invention. This comprises a base element 6, on the surface 2 of which an anti-slip coating 3 is arranged. The anti-slip coating 3 does not have to cover an entire surface of the mobile phone stand 1 and can also be provided in a structured form, e.g. only being present in corner regions or along the edges of the mobile phone stand 1. The anti-slip coating 3 can be a film or a mat that has an adhesive property or a high friction coefficient, so that a mobile phone placed on the anti-slip coating 3 of the mobile phone stand 1 is more effectively held on it. The mobile phone stand 1 also comprises a module 4 suitable for wireless near-field communication, on which the first information item is stored. In addition, the mobile phone stand 1 can have a charging coil 5, with which a mobile phone can be inductively charged.

What is claimed is:

1. A method for adjusting at least one communication capability function of a mobile phone in a vehicle, the method comprising the following steps:

reading out a first information item from a module configured for wireless near-field communication, which is arranged in a mobile phone stand of the vehicle, by means of a corresponding readout module of the mobile phone (S1);

transmitting a second information item from the mobile phone to a system module of the vehicle (S2);

receiving and processing the second information item in the system module of the vehicle in order to provide a third information item (S3);

transmitting the third information item from the system module of the vehicle to the mobile phone (S4); and adjusting the at least one communication capability function of the mobile phone on a basis of the received third information item (S5), wherein adjusting the communication capability function comprises either activating or deactivating, an airplane mode setting of the mobile phone, a volume setting of the mobile phone, a ring setting of the mobile phone, an alarm setting of the mobile phone, or a sleep mode setting of the mobile phone.

2. The method as claimed in claim 1, the module configured for wireless communication being integrated into the mobile phone stand in the vehicle.

3. The method as claimed in claim 2, the mobile phone stand having a support surface for the mobile phone, which support surface has an anti-slip coating.

4. The method as claimed in claim 1, further comprising launching a pre-determined application on the mobile phone in response to the reading of the first information item, the second information item being provided by the pre-determined application.

5. The method as claimed in claim 1, further comprising activating an inductive charging interface integrated in the mobile phone stand on a basis of the processed second information item.

6. The method as claimed in claim 1, the third information item being provided on a basis of a preset operating profile assigned to the mobile phone.

7. The method as claimed in claim 1, the third information item being also provided on a basis of a user input made by a user via a user interface of the vehicle.

8. The method as claimed in claim 1, wherein adjusting the communication capability function comprises either activating or deactivating the airplane mode setting of the mobile phone.

9. The method as claimed in claim 1, wherein adjusting the communication capability function comprises either activating or deactivating the volume setting of the mobile phone.

10. The method as claimed in claim 1, wherein adjusting the communication capability function comprises either activating or deactivating the alarm setting of the mobile phone.

11. The method as claimed in claim 1, wherein adjusting the communication capability function comprises either activating or deactivating the ring setting of the mobile phone.

12. The method as claimed in claim 1, wherein the adjusting step affects a functionality of the mobile phone without affecting a functionality of the vehicle.

13. The method as claimed in claim 1, wherein deactivating the communication capability function prevents the mobile phone from receiving data.

14. The method as claimed in claim 1, wherein deactivating the communication capability function prevents the mobile phone from communicating to a user of the mobile phone.

15. The method as claimed in claim 1, wherein either activating or deactivating the communication capability function encompasses either activating or deactivating pre-configured operating modes of the mobile phone.

16. A method for adjusting at least one communication capability function of a mobile phone in a vehicle, the method comprising the following steps:

reading out a first information item from a readout module of the mobile phone (S1);

transmitting a second information item from the mobile phone to a system module of the vehicle (S2);

receiving and processing the second information item in the system module of the vehicle in order to provide a third information item (S3);

transmitting the third information item from the system module of the vehicle to the mobile phone (S4); and adjusting the at least one communication capability function of the mobile phone on a basis of the received third information item (S5), wherein adjusting the communication capability function comprises either activating or deactivating, an airplane mode setting of the mobile phone, a volume setting of the mobile phone, a ring setting of the mobile phone, an alarm setting of the mobile phone, or a sleep mode setting of the mobile phone.

* * * * *